United States Patent

[11] 3,587,826

| [72] | Inventors | John M. Holzer<br>West Allis;<br>Palmer T. Severson, Wauwatosa, Wis. |
|---|---|---|
| [21] | Appl. No. | 804,764 |
| [22] | Filed | Mar. 6, 1969 |
| [45] | Patented | June 28, 1971 |
| [73] | Assignee | Cutler-Hammer, Inc.<br>Milwaukee, Wis. |

[54] DIVERTING SWITCH MECHANISM FOR CONVEYORS
9 Claims, 7 Drawing Figs.

[52] U.S. Cl. .................................................. 198/83,
198/66, 198/165
[51] Int. Cl. .............................................. B65g 37/00
[50] Field of Search .......................................... 214/6 (M);
271/64; 198/66, 75, 83, 165; 193/36, 39

[56] References Cited
UNITED STATES PATENTS

| 1,302,466 | 4/1919 | Finster et al. .................. | (271/64UX) |
| 2,497,149 | 2/1950 | Berdis et al. .................. | (271/64UX) |
| 2,750,186 | 6/1956 | Bruneau et al. .............. | 271/64X |
| 3,166,206 | 1/1965 | Porter et al. .................. | 214/6(M)X |
| 3,292,783 | 12/1966 | Quiet et al. .................. | 214/6(M)X |

Primary Examiner—Gerald M. Forlenza
Assistant Examiner—Frank E. Werner
Attorney—Hugh R. Rather ABSTRACT: A lapped stream of articles transported along a wire belt conveyor system is interrupted and diverted through a conveyor gap normally spanned by a pivotable bridging conveyor section. A stream interrupting finger assembly is momentarily driven into the stream ahead of the bridging section while the upstream end of the latter is pivoted across the stream path to open the conveyor gap. Both the finger assembly and bridging section are driven by a common linkage powered by the conveyor through a single revolution clutch. Alternate operations reverse the bridge movement to restore the stream to its original path of travel.

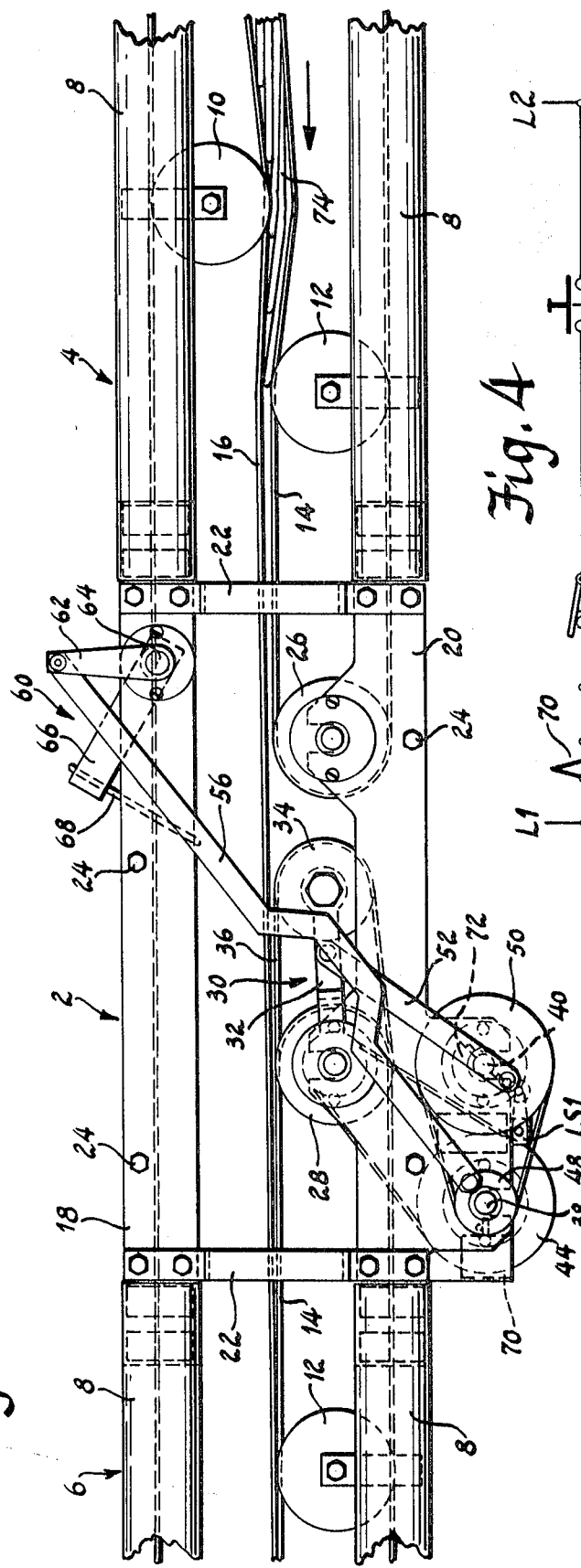
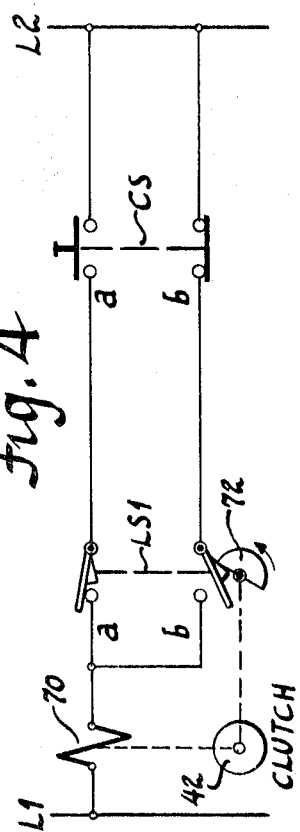
Fig. 2
Fig. 4

DIVERTING SWITCH MECHANISM FOR CONVEYORS

BACKGROUND OF THE INVENTION

This invention relates generally to conveyors for transporting articles therealong and provides therefor a switching mechanism for diverting the articles from their normal path of travel. The invention particularly relates to power driven wire belt conveyors for transporting articles therealong in a lapped stream and provides a switching mechanism therefor which is capable of diverting the stream of articles from its original path of travel and of subsequently restoring the stream to the original path of travel.

In the prior art, one such switching mechanism is disclosed in U.S. Pat. No. 2,795,312 to F.E. Howdle and assigned to the assignee herein. In that mechanism, the stream of articles is required to exit a first conveyor section, freely traverse a relatively large gap, and strike upon the upper surface of a stationary guide plate to be guided into a second conveyor section. The stream is diverted by creating a gap in the stream, allowing the last article of the forward portion of the stream, to traverse the gap and then driving the exit end of the first conveyor section downward to direct the following stream portion below the stationary guide plate to the alternate conveyor path.

There are several advantages in the mechanism of the immediate disclosure over the over the above prior art device. Of primary importance is the reduction in the length of conveyor gap in which the stream is unpowered or unguided. The articles in the stream often slip or shift relative to one another when traversing large unpowered gaps to disturb the uniformity of the lap lead of the articles and the position of the stream. Conveyor systems of the above type generally transport the articles in the lapped stream to high-speed packaging machinery which, when operating at modern day speeds, requires a high degree of uniformity in the stream of articles to function smoothly.

The switching mechanism presented herein has further advantages over the aforementioned prior art device inasmuch as it is powered, through appropriate linkages, from the conveyor to provide operation in direct proportion and synchronism with the conveyor speed. As will be brought out in greater detail in the following specification, the conveyor powered drive arrangement provides the immediate switching mechanism with a shorter overall operating cycle time necessary for modern day systems.

SUMMARY OF THE INVENTION

The invention disclosed herein provides a diverting switch mechanism for conveyors which occupies a minimal amount of conveyor length, utilizes a movable powered conveyor portion as the switching element to establish a minimal length unpowered gap in the conveyor, and reliably operates repeatedly in response to proper control signals to alternately divert the stream to an alternate path and restore the diverted stream to the original path thereof with a minimum of disturbance to the uniformity of the restored portion of the stream.

It is therefor a primary object of this invention to provide a diverting switch mechanism for conveyors which will reliably divert a stream conveyed thereon to an alternate path and subsequently restore the stream to the original path with a minimum of disturbance to the uniformity of the restored stream.

It is a further object of this invention to provide a diverting switch mechanism for conveyors which establishes a relatively small, unpowered gap in the conveyor to permit a stream of articles to be conveyed thereover with a minimum of disturbance to the uniformity of the stream when the mechanism is not diverting the stream.

It is still another object of this invention to provide a diverting switch mechanism for conveyors which is powered at a speed in direct proportion to that of the conveyors to operate in synchronism with the speed of the stream of articles being conveyed thereby.

These and other objects and advantages will become more readily apparent in the following specification and claims when read in conjunction with the accompanying drawings.

BRIEF DESCRIPTION OF THE DRAWINGS

FIG. 2 is a side elevational view of the conveyor section and diverting switch mechanism of FIG. 1;

FIG. 4 is an electrical diagram showing one form of control system for the mechanism of this invention.

DESCRIPTION OF THE PREFERRED EMBODIMENT

Figure 1:
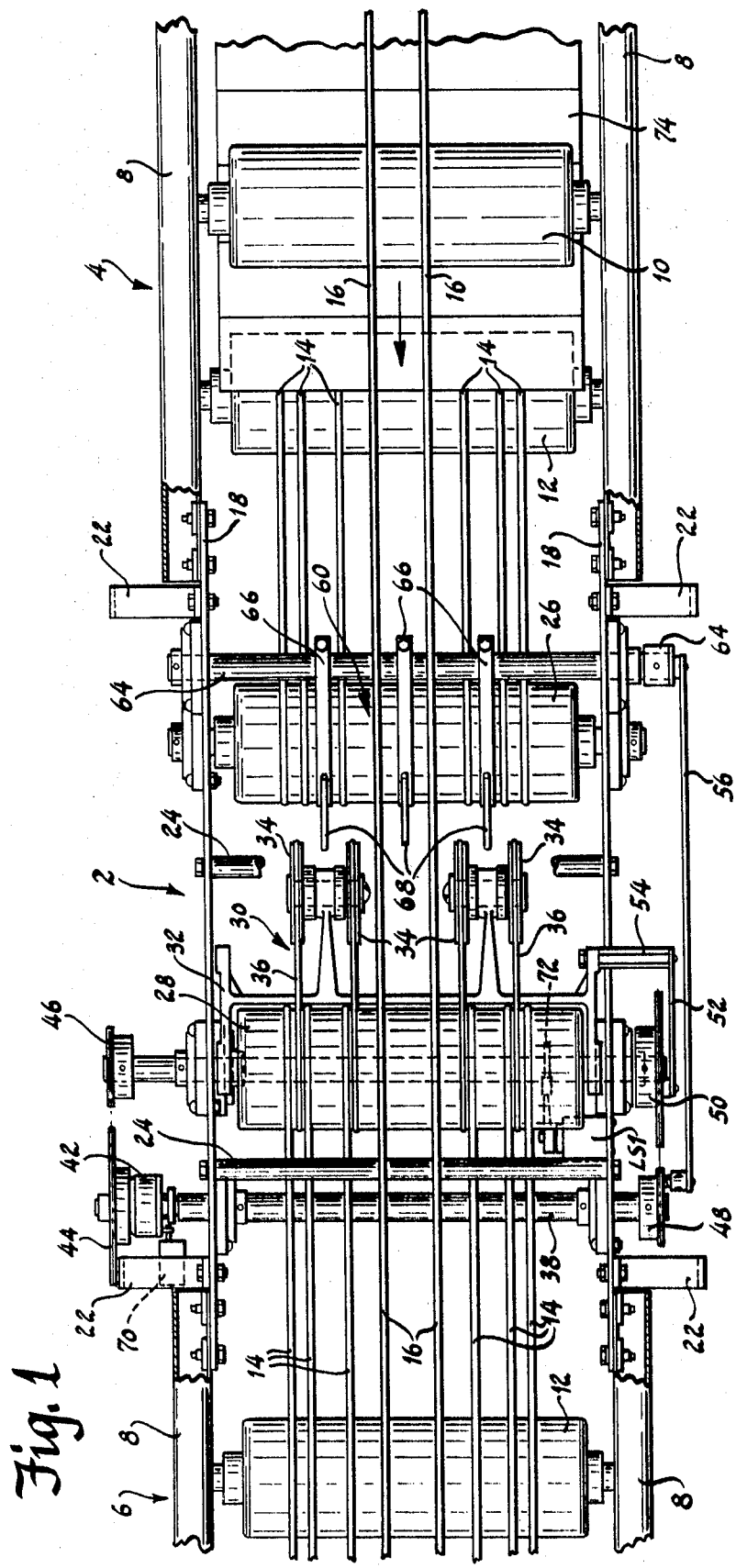
FIG. 1 is a plan view of a fragment of wire belt conveyor in which the diverting switch mechanism of this invention is mounted.

With reference to FIGS. 1 and 2 of the drawings, the diverting switch mechanism 2 of this invention is shown inserted in a channel-type wire belt conveyor. The diverter 2 fits within a break formed in the conveyor line and divides the conveyor into an upstream section 4 and a downstream section 6.

The channel-type wire belt conveyor used in this application briefly comprises upper and lower pairs of opposed, spaced steel channels 8 between which are clamped the bearing brackets of transversely extending, upper and lower rollers 10 and 12, respectively. The lower rollers 12 receive a plurality of sets of endless wire belts 14, each set encompassing a given number of lower rollers and one roller of which is supplied with rotational power by a motor or the like (not shown) to drive the belts. Similarly, upper rollers 10 receive sets of wire belts 16 to extend parallel to the lower belts and which are driven by a powered roller in synchronism with the lower belts. Lower belts 14 which carry the lapped stream of articles thereon, are termed support belts. Upper belts 16 serve to hold the individual articles in place in the stream and are termed cover belts. Because of their relative functions, a greater number of support belts are provided than cover belts as may be seen in FIG. 1.

The framework of diverter 2 is mounted between the adjacent ends of upstream and downstream conveyor sections 4 and 6, respectively. Each side portion of the frame comprises upper and lower plates 18 and 20, respectively, which are clamped to the ends of the respective upper and lower channels 8 of each conveyor section. Support straps 22 provide vertical spacing between the plates 18 and 20 while tie rods 24 provide the transverse spacing between the respective sides.

A pair of idler rollers 26 and 28 have their opposite ends journaled for rotation within bearing housings which are secured to the plates 20. Roller 26 is toward the upstream end of diverter 2 and lower belts 14 of the upstream conveyor section 4 are lengthened to extend around the roller 26. Similarly, the lower belts of downstream conveyor section 6 are lengthened to encompass the roller 28 on the down stream end of diverter 2.

With the upstream and downstream conveyor sections extended to include the rollers 26 and 28, respectively, a gap exists therebetween which is substantially bridged by a pivotally movable wire belt conveyor section 30. Conveyor section 30 comprises a yoke member 32 journaled for rotation about the shaft of roller 28. Yoke 32 has a pair of laterally spaced posts extending outwardly therefrom toward the upstream roller 26. The outer end of each post rotatably supports pairs of idler rollers 34. A plurality of wire belts 36 are provided to extend around the roller 28 and each of the idler rollers 34. Lower belts 14 of the downstream conveyor section 6 are driven from a powered roller (not shown) and in turn drive the roller 28 to drive the belts 36.

Frame members 20 have downward projections formed at their downstream ends, between which are journaled a pair of transversely extending shafts 38 and 40. As best seen at the top of FIG. 1, the shaft of roller 28 and shaft 38 extend outwardly beyond the side frames of diverter 2. Shaft 38 carries a single revolution clutch 42 thereon and is connected to the output end thereof. The input end of clutch 42 is connected to a sprocket 44. Shaft 28 has a sprocket 46 secured thereto and an endless chain links the two sprockets 44 and 46 together so that the input end of clutch 42 is constantly powered by means of the shaft of roller 28. The particular ratio between the sprockets 46 and 44 is chosen to be a 2:1 reduction whereby the rotational velocity of clutch 42 is one-half that of the roller 28.

The shaft 38 also extends beyond the side plate 20 at the near side of the conveyor system as seen in the lower part of FIG. 1. The near end of shaft 38 has a sprocket 48 attached thereto aligned with a larger sprocket 50 secured to the extending near end of shaft 40. An endless chain is provided to link the two sprockets 48 and 50. The ratio between sprockets 48 and 50 is also chosen to be a 2:1 reduction ratio which produces a 4:1 reduction ratio between the sprocket 46 on shaft 28, which is running at conveyor speed, and the sprocket 50 on shaft 40.

A link member 52 is pivotally connnected at one end to the side of sprocket 50 in an eccentric position and is pivotally connected at the other end to the free end of a spacer 54 bolted securely to the yoke member 32 (FIG. 1). A second link member 56 is pivotally connnected at one end to the side of sprocket 48 (FIG. 1) and has its other end pivotally conn- nected to a crank arm member 62 of a stream interrupting assembly 60. As may be seen in FIG. 1, link 56 is spaced to the outside of link 52 to avoid interference between the two members.

Stream interrupting assembly 60 comprises a main shaft 64 journaled for rotation between the upper side plates 18 at the upstream end of diverter 2. Crank arm 62 is rigidly secured to the outwardly extending near end of shaft 64 as viewed in the drawings. A trio of support arms 66 are rigidly clamped to the shaft 64 to extend in the downstream direction therefrom and at a slight upward angle from the horizontal in the original nondiverting position of the mechanism. As may be seen in FIG. 1, one support arm 66 is positioned at the center of the stream and each of the other support arms are transversely positioned between the respective pairs of rollers 34 on conveyor section 30. Each support arm is provided at its outer end with a longitudinally adjustable fingerlike rod member 68 which extends at right-angles with the arm and downwardly toward the stream.

The single revolution clutch 42 is controlled by a pull-type solenoid 70 which is secured to the downwardly extending portion of the far side lower plate member 20. A suitable bracket or spacer (not shown) is interposed between the solenoid 70 and plate 20 to align the plunger of solenoid 70 with the rotational path of a clutch release stop member carried by the clutch. The plunger normally extends to interfere with the stop and hold the clutch disengaged. Energization of solenoid 70 retracts the plunger to permit the clutch to self-engage and drive the shaft 38 until such time as the plunger again extends to interfere with the clutch release stop member.

A limit switch LS1 is mounted on the inner side of the downward extension of near side lower frame member 20. The arm of limit switch LS1 extends toward shaft 40 in line with a semicircular cam 72 secured on the shaft 40. With the diverter mechanism in the position shown in FIGS. 1 and 2, the cam 72 is adjusted to actuate limit switch LS1 immediately upon movement of shaft 40 and to hold the switch actuated at the end of one-half revolution of the shaft 40.

The control system for the diverter mechanism is shown diagrammatically in FIG. 4. One side of solenoid 70 is connected to a supply line L1 and the other side of the solenoid is connected to both the normally closed $a$ contacts and normally open $b$ contacts of two pole, double throw limit switch LS1. The other side of the $a$ and $b$ limit switch contacts are connnected to the other supply line L2 through a control switch CS.

Control switch CS may be of many types according to the desired function for the diverting switch 2. The exemplary switch shown in FIG. 4 is a two pole, double throw pushbutton having normally open $z$ contacts and normally closed $b$ contacts connected to the $a$ and $b$ limit switch contacts, respectively. In this instance, depression of the pushbutton CS will initiate a diverting operation and release thereof will initiate the return of the mechanism as will be brought out in later description.

OPERATION

Will reference to the drawings, assume the diverting switch mechanism 2 to be operatively connected into the conveyor system to form upstream conveyor section 4 and downstream conveyor section 6 as aforedescribed, and that the appropriate electrical connections have been made as aforedescribed in conjunction with FIG. 4. With power on, a lapped stream of articles 74 is transported between the support belts 14 and cover belts 16 from the upstream conveyor section 4 the downstream section 6 and beyond.

Upon some demand for a cessation in the supply of articles downstream from diverting switch 2, the pushbutton CS is depressed to close its $a$ contacts and energize solenoid 70 through the normally closed $a$ contacts of limit switch LS1. Solenoid 70 retracts its plunger to permit clutch 42 to engage and drive shaft 38 at one-half the velocity of the conveyor roller shaft 28. Shaft 38 in turn drives shaft 40 at one-half the speed of shaft 38 through the reduction drive of sprockets 48 and 50 and their connecting chain. Immediately, cam 72 trips limit switch LS1 to open the $a$ contacts and drop out solenoid 70, permitting the plunger thereof to enter into the rotational path of the clutch release stop member to disengage the clutch upon a complete revolution.

With reference to FIGS. 2, 3$a$ and 3$b$ it may be seen that the rotational movement of sprockets 48 and 50 drive the stream interrupting assembly fingers and bridging conveyor section 30 through the respective links 56 and 52. The fingers 68 are pivoted into the stream to engage the leading edge of one of the articles to hold that article and subsequent articles back while the bridging conveyor section 30 is being pivoted upwardly across the stream. As seen in FIG. 3$a$ wherein one-half revolution of clutch travel has been traversed, the belts 36 and rollers 34 of conveyor section 30 are pressing the trailing edge of the last article against the cover belts 16 to drive, or pull, that article from under the detained articles. It may also be noted that the pivotal path of fingers 68 is such that the fingers tend to brush the first engaged article against the stream direction.

FIG. 3$b$ represents the diverting switch mechanism at the completion of a single revolution of clutch 42. The fingers 68 of the stream interrupting assembly 60 were in the stream 74 only momentarily, the maximum position being shown in FIG. 3$a$, and are now back to their original position while the bridging section continued upwardly to its highest position as shown in FIG. 3$b$. Because of the 2:1 ratio between sprockets 48 and 50, the latter has travelled only one-half revolution and hence the conveyor 30 remains raised until the next operation. It may be seen that the released stream is being diverted under gravitational influence between the rollers 26 and 28 to an alternate path therebelow.

An important feature of this diverting switch mechanism is its ability to cleanly and reliably restore the diverted stream to its initial path with little disturbance to the article stream. This is easily accomplishes in the reverse sequence as just described and is initiated in this exemplary embodiment by the release of pushbutton CS. Release of switch CS closes the $b$ contacts thereof to energize solenoid 70 through the now closed $b$ contacts of LS1. The energization of solenoid 70 permits the clutch 42 to engage and immediately LS1 is released by cam 72 to drop out the solenoid.

Figure 3A:
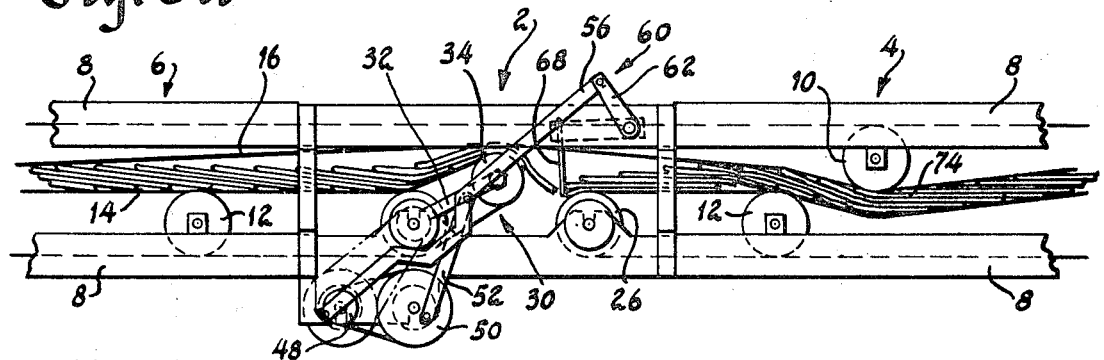
FIGS. 3a, b, c and d are schematic representations of the conveyor and diverting switch mechanism sequentially depicting an operating cycle of the mechanism.
Figure 3B:
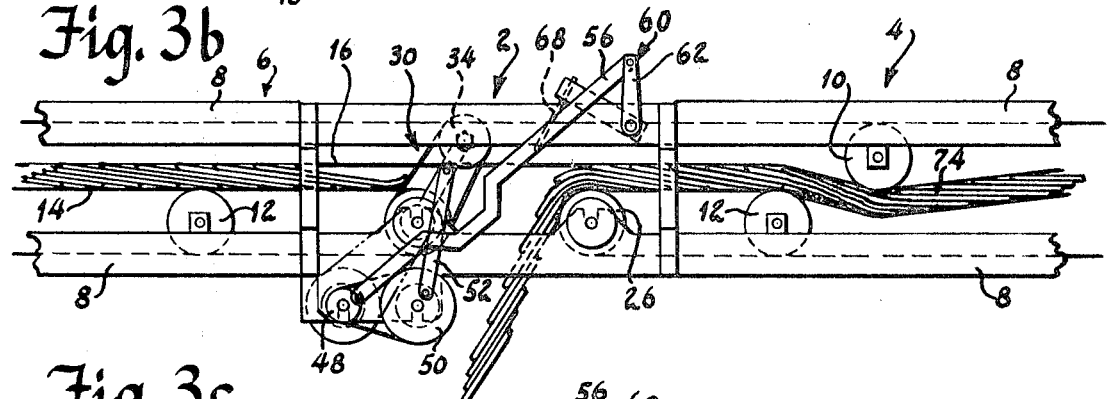
Figure 3C:
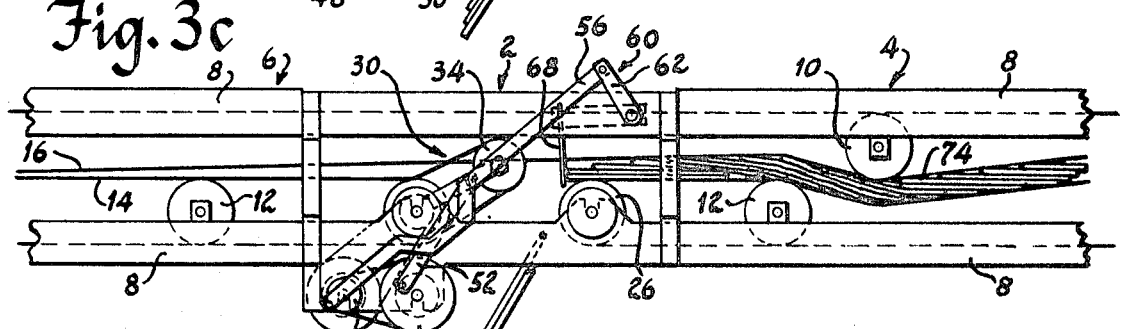
Figure 3D:
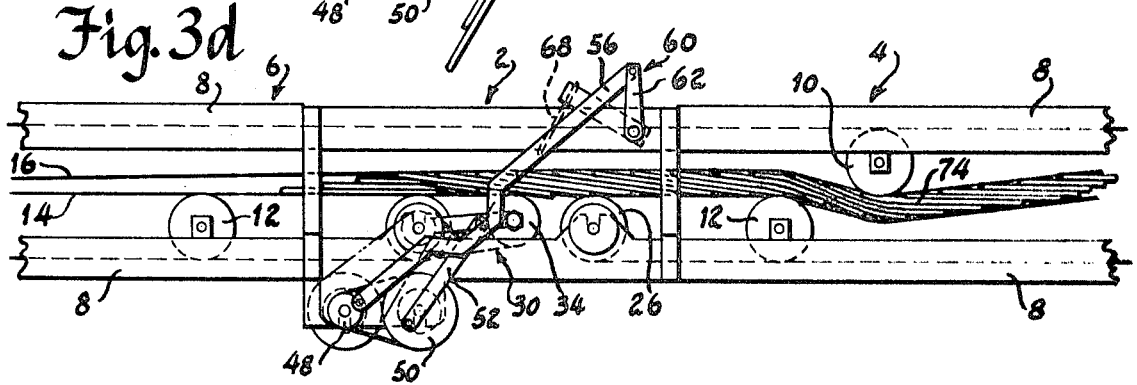

Clutch 42 drives the shafts 38 and 40 and respective sprockets 48 and 50 as described before. Sprocket 50 is driven through the remaining one-half revolution to pivot bridging conveyor section 30 downwardly to its original position while sprocket 48 is driven through a complete revolution to again pivot the fingers 68 into and out of the stream. FIG. 3c depicts the diverting switch mechanism at one-half revolution of clutch 42 in the restoration of stream 74. Fingers 68 are in their maximum stream interrupting position and the last article has been driven out by roller 26. In FIG. 3d the cycle has been completed, the fingers 68 and bridge 30 have returned to their original positions and the stream 74 is again being transported from upstream section 4 to and beyond downstream section 6.

While it should be apparent that the movements of stream interrupting fingers 68 and bridging conveyor 30 start and stop simultaneously, the functional portions of the movements of the respective parts give the appearance of being sequential; that is the fingers moving into the stream, then the bridge moving across the path of the stream and finally the fingers releasing the steam. It is to be understood that the exact timing between the bridge 30 and fingers 68 may be altered by adjusting the relative positions of sprocket 38 and 50. Furthermore, the speed of the diverter may be changed proportional to conveyor speed by the selection of a different ratio between sprockets 44 and 46.

Another variable in this device is the exact type of control switch CS to be used and the purpose of diverting switch mechanism. It is contemplated that the diverting switch mechanism be used in conjunction an article stacking machine or the like and be responsive automatically to certain stream conditions. For instances, it is directly contemplated that the control switch CS be a limit switch located upstream from the diverting switch and actuatable by an askew article, abnormal stream thickness or an offcenter stream alignment, any one of which could cause the stacking machine to falter. The control switch would automatically cause a diverting operation of the mechanism until the abnormal condition cleared, and would then cause the mechanism to restore the stream to the original path.

It is also contemplated that the switch CS could be located in the stacking machine to sense a jam in the machine and automatically initiate the diversion of the supply stream. Such diversion would in this case be maintained until the stacking machine had been cleared.

The foregoing description and drawings are intended to show an exemplary embodiment of this invention which is susceptible of various modifications not specifically mentioned herein without departing from the scope of the appended claims.

We claim:

1. In a conveyor system for transporting articles in a lapped stream, the combination comprising:
   first and second conveyors arranged in spaced apart longitudinal alignment;
   a third conveyor pivotally mounted within the space between said first and second conveyors and normally aligned to substantially bridge the space therebetween to transport said lapped stream from said first to said second conveyor;
   stream interrupting means normally disposed out of the plane of said lapped stream; and
   operating means operable to sequentially move said stream interrupting means into the stream path at the output end of said first conveyor to arrest the forward progress of immediately subsequent articles, then pivot the upstream end of said third conveyor across the path of said stream, and then move said stream interrupting means out of said lapped stream, said stream thereafter being diverted through the space between said first and second conveyors.

2. The combination according to claim 1 wherein said operating means include means subsequently operable to sequentially move said stream interrupting means into the stream path at the output end of said first conveyor to arrest the forward progress of immediately subsequent articles, then pivot the upstream end of said third conveyor back across the path of said stream to the original bridging position of said third conveyor, and then move said stream interrupting means out of said stream, said stream thereafter being conveyed by said third conveyor to said second conveyor.

3. The combination according to claim 1 together with cover belt conveyor means overlying said first and second conveyors and being continuous therebetween, said cover belt conveyor means being driven in synchronism with said first and second conveyors, and said stream being transported between said cover belt conveyor means and said first and second conveyors.

4. The combination according to claim 3 wherein said stream interrupting means are mounted for pivotal movement into and out of said lapped stream, said stream interrupting means being movable into the path of said lapped stream in a direction opposed to the direction of travel of said lapped stream.

5. The combination according to claim 3 wherein said operating means includes:
   a mechanical linkage interconnecting said steam interrupting means and said pivotally mounted third conveyor for synchronizing the movements thereof;
   means for driving said linkage in synchronism with the operating speed of said conveyors; and
   electrical control means for controlling said means for driving said linkage.

6. The combination according to claim 5 wherein said means for driving said linkage comprises a single revolution clutch powered from a driven portion of one of said conveyors and actuable in response to a signal from said electrical control means to affect the aforementioned sequential movement of said stream interrupting means and said third conveyor to divert said stream through the space between said first and second conveyors.

7. The combination according to claim 6 wherein the next clutch actuation responsive to a subsequent signal form said electrical control means affects the reverse sequential operation of said interrupting means and said third conveyor to restore the stream to its original path from said first to said second conveyor.

8. The combination according to claim 7 wherein said control means includes an electrical switch means having an operator sensitive to abnormal stream thickness or position for actuating said electrical switch means.

9. The combination according to claim 3 wherein said third conveyor is mounted for pivotal movement about the axis of the upstream end roller of said second conveyor, together with idler rollers carried by the free end of said third conveyor and belt means extending between and around said end roller and said idler rollers, said belt means being driven by said end roller.